United States Patent [19]

Estkowski

[11] 4,453,369
[45] Jun. 12, 1984

[54] METHOD OF PRODUCING SEED MARKER TABS

[76] Inventor: Michael H. Estkowski, 1756 Outer Dr., St. Joseph, Mich. 49085

[21] Appl. No.: 402,534

[22] Filed: Jul. 28, 1982

Related U.S. Application Data

[62] Division of Ser. No. 182,950, Sep. 2, 1980, Pat. No. 4,353,183.

[51] Int. Cl.³ .............................................. A01C 1/04
[52] U.S. Cl. ...................................... 53/432; 53/453; 53/474
[58] Field of Search ................ 53/474, 427, 509, 453, 53/432, 467; 141/118, 119, 123, 195, 8, 67; 47/56

[56]  References Cited

U.S. PATENT DOCUMENTS

| 2,861,405 | 11/1958 | Hanford | 53/427 |
| 3,036,604 | 5/1962 | Donofrio | 141/284 |
| 3,098,320 | 7/1963 | Estkowski | 47/56 |
| 3,098,321 | 7/1963 | Estkowski | 47/56 |
| 3,294,045 | 12/1966 | Kelley et al. | 47/56 |
| 3,445,981 | 5/1969 | Hori | 47/56 |
| 3,656,517 | 4/1972 | Taylor | 141/129 |
| 3,656,518 | 4/1972 | Aronson | 141/167 |
| 3,786,614 | 1/1974 | Mistarz | 53/282 |
| 3,908,308 | 9/1975 | Meyers | 47/56 |
| 4,080,755 | 3/1978 | Crosby | 47/56 |
| 4,116,247 | 9/1978 | Zanasi | 141/81 |

FOREIGN PATENT DOCUMENTS 2041683 11/1978 Fed. Rep. of Germany ...... 141/284

Primary Examiner—Nicholas P. Godici
Assistant Examiner—Kurt Rowan
Attorney, Agent, or Firm—Harry G. Thibault

[57] ABSTRACT

An improved seed marker tab comprising an elongated flat tab element proportioned to have one end thereof inserted in the soil to a predetermined level with the other end thereof projecting above the soil. The tab is formed of stiff, relatively thin, self-supporting material and the end portion that is inserted in the soil has preferably an indentation or pod formed in one end thereof. Openings provided at the back of the pod for receiving seeds specifically determine number and location of seeds mounted on the tab. Filler material covers the seeds overlying the openings to complete the assembly. The improved seed marker tab results from a new process whereby vacuum means are used to hold the seed in place while the tab assembly is completed.

9 Claims, 16 Drawing Figures

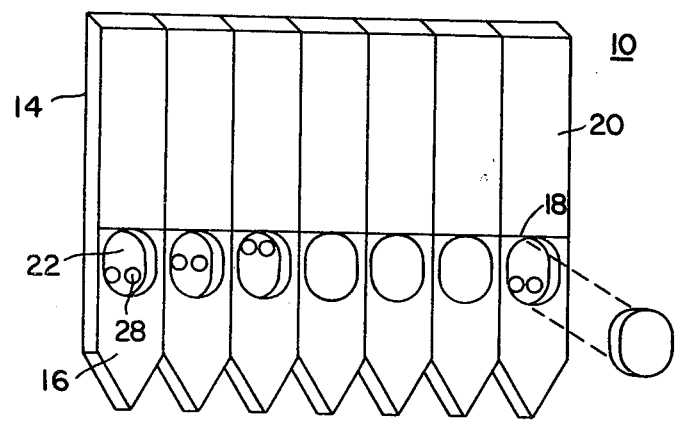
FIG. 1
FIG. 2a
FIG. 2b
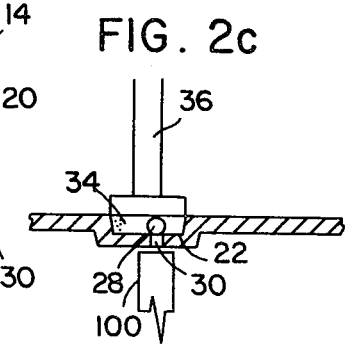
FIG. 2c
FIG. 5a
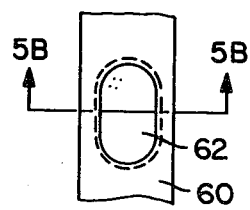
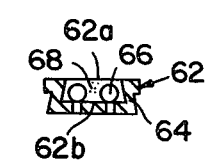
FIG. 5b
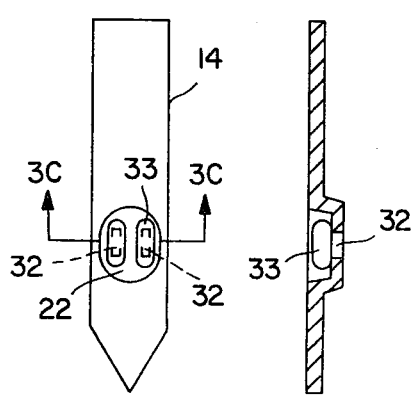
FIG. 3a  FIG. 3b
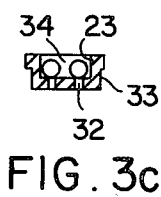
FIG. 3c

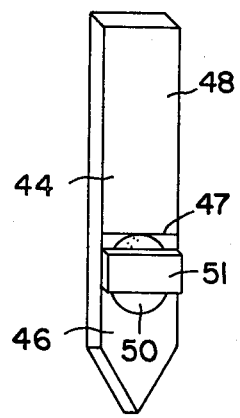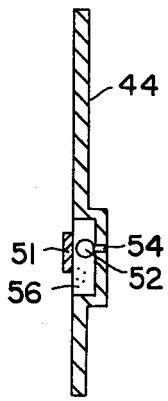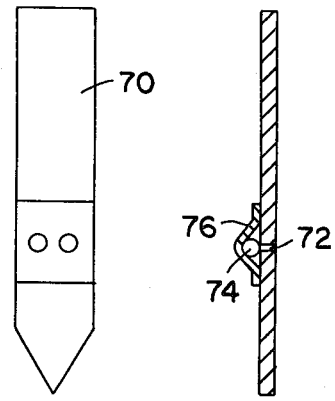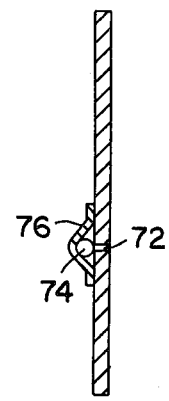
FIG.4a  FIG.4b        FIG.6a  FIG.6b
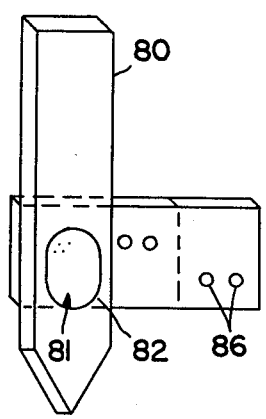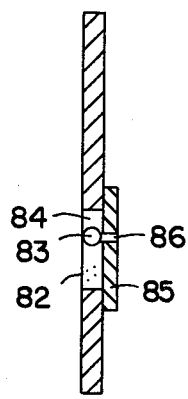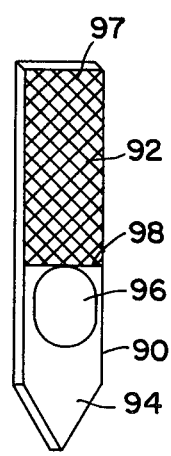
FIG.7a  FIG.7b    FIG.8

METHOD OF PRODUCING SEED MARKER TABS

This application is a division of application Ser. No. 182,950, filed Sept. 2, 1980, now U.S. Pat. No. 4,353,183.

FIELD OF THE INVENTION

This invention pertains generally to the planting of seeds, such as flower, vegetable and tree seeds, and more particularly to an improved marker seed tab device which facilitates planting and germination of such seeds.

DESCRIPTION OF THE PRIOR ART

In the conventional method of planting small quantities of flower, vegetable or tree seeds, a small depression or hole is made in the soil to what is believed to be the correct depth for the particular type of seed being planted, and what is believed to be the correct quantity of seed is then deposited in the hole, with the seed or seeds then being covered over with soil.

It will be readily apparent that with such prior planting methods there is considerable possiblity for error both in depth of planting and the number of seeds planted. In instances where it is desirable to germinate seeds under controlled environmental conditions, it has been the practice initially to plant the seeds in a tray or flat, and following germination and sprouting of the seedlings to transplant physically the seedlings to the desired location; such a procedure is obviously both laborious and wasteful of both seed and time.

In prior art U.S. Pat. Nos. 3,098,320 and 3,098,321 issued to the present inventor, there is described and illustrated a seed marker tab comprising an elongated tab proportioned to have one end inserted in the soil at a predetermined level with the other end thereof projecting above the soil. In this prior seed marker tab, one end portion of the tab has at least a part of one surface thereof coated with adhesive material with a predetermined number of seeds adhered thereto and with a layer of blotting paper adhered to the adhesive material thus covering and protecting the seed. A plurality of such prior seed marker tabs may be joined edgewise initially to form a card for merchandising purposes, and the tabs may be subsequently separated for individual use.

In U.S. Pat. No. 3,098,321 such seed marker tabs were improved to provide a seed marker tab comprising an elongated flat tab proportioned to have one end thereof inserted in the soil to a predetermined level with the other end thereof projecting above the soil. The tab was formed of stiff, relatively thin, self-supporting material such as plastic and the end portion that was inserted in the soil had an indentation or pod formed in one surface thereof. A predetermined quantity of seed was then positioned in the pod and a relatively thin layer of absorbent material was adhered to and covered at least a part of a surface of the tab in which the pod was formed, thus covering the seed.

The improved seed marker tab of the present invention has been further modified to refine and improve the placement of seeds as well as to define a structure which would permit proper alignment of a specific number of seeds and including a filler material to fill the cavity in which the seeds are placed. Different sizes or shapes of seeds can be placed each in a separate tab which can be connected together to form a single card; and the vertical locations of seed-receiving openings can be varied to optimize planting depths for varying types of seeds. Further, the marker tab is formed of a biodegradable material to facilitate germination and growth of seedlings.

The improved seed marker tab is particularly useful with a new process designed to more efficiently and effectively fill and process the seed marker tabs during manufacture.

Thus the present improvement represents an advance over the seed tabs of the prior art as described below.

SUMMARY OF THE INVENTION

The present invention provides an improved seed marker tab which comprises an elongated flat tab proportioned at one end thereof and inserted in the soil to a predetermined level with the other end portion thereof projecting above the soil. The end portion which is inserted in the soil has an indentation or pod formed in a lower end thereof. Holes provided in the indentation are specifically sized to accommodate certain seed types and are numerically placed to carefully control the amount of seeds placed in the pod. Further, the holes are vertically aligned to insure proper planting depth for the seeds when used in conjunction with the planting line provided on the marker tab.

The manufacturing process associated with the production of seed marker tabs is greatly simplified by the inclusion of these predetermined, presized and prelocated hole patterns provided in the pod in the marker tab. For example, a vacuum provided below the pod holds in place only those seeds which fall into the holes provided in the pod when an indeterminate amount of seed is poured over the tab. The remaining seeds can then be blown or vacuumed or brushed away, leaving behind only the seeds held in place in the holes in the pod by the vacuum applied from below. Then, an appropriate filler material, preferably an absorbent material containing disease inhibiting or growth enhancing chemicals can be applied to the seeds to fill the pod. Alternative forms of completing the assembly include covering the seeds and the filler material in the pod with an absorbent adhesive tape. Another alternative structure of the seed marker tab provides a tab with no indentation but with holes of an appropriate size, depth and number specifically positioned on the tab. A vacuum is applied to the marker tab from below, the unwanted seeds are then swept away and an adhesive material is sprayed onto the marker tab or tape is wrapped around the tab to hold the seeds in place.

The present invention provides an improved and more efficient marker tab arrangement than disclosed in the prior art and further discloses process which facilitates the manufacture of such improved marker tab. These and other advantages of the present invention will become apparent upon a reading of the following specification and an inspection of the accompanying drawings, and the features of novelty which characterize our invention will be pointed out with particularity in the claims annexed to and forming a part of this specification.

DESCRIPTION OF THE DRAWINGS

FIG. 1 is a view in perspective showing a plurality of edgewise joined seed marker tabs which incorporate the improvement specified in the present invention;

FIG. 2a is a perspective view of a seed marker tab showing the placement of the seed receiving holes in the marker tab;

FIG. 2b is a cross-sectional view of the seed marker tab of FIG. 2a;

FIG. 2c is a cross-sectional view of a portion of a seed marker tab similar to the cross-sectional view shown in FIG. 2b, a portion of the view merely showing tamping means for pressing the filler material in place;

FIG. 3a is a perspective view of a seed marker tab having elongated slots in the indentation in the tab;

FIG. 3b is a cross-sectional view of the seed marker tab of FIG. 3a;

FIG. 3c is a view taken along the line 3c—3c of FIG. 3a;

FIG. 4a is a perspective view of another embodiment of the seed marker tab of the present invention;

FIG. 4b is a cross-sectional view of the seed marker tab shown in FIG. 4a;

FIG. 5a is a broken away portion of another embodiment of a seed marker tab of the present invention;

FIG. 5b is a cross-sectional view taken along the line 5b—5b of FIG. 5a, similar to FIG. 3c;

FIG. 6a is a view of yet another embodiment of the improved seed marker tab of the present invention;

FIG. 6b is a cross-sectional view of the seed marker tab of FIG. 6a;

FIG. 7a is yet another embodiment of the improved seed marker tab of the present invention;

FIG. 7b is a cross-sectional view of the seed marker tab of FIG. 7a; and

FIG. 8 is a view of the improved seed marker tab of the present invention wherein a water barrier is provided therefor.

DETAILED DESCRIPTION OF THE INVENTION

Referring now to FIGS. 1, 2a, 2b and 2c of the drawing, there is shown a card 10 comprising a plurality of initially edgewise joined seed marker tab elements or tabs 14. Each seed marker tab element or tab 14 is formed of a suitable biodegradable, self-supporting material which will not be crumpled when inserted in the soil. Each tab element 14 has a lower end portion 16 adapted to be inserted in the soil to a predetermined level, indicated generally by planting line 18, and an upper portion 20 which projects above the planting line 18. An oblong axially extending indentation or pod 22 is formed in the lower end portion 16, as shown. The desired seed 28, shown here as a pair of relatively small seeds 28, are positioned in the pod 22 on pre-positioned openings 30 (see FIG. 2b). The openings 30 are positioned at a predetermined location with respect to the planting line 18 as determined by the particular seed. Note the differences in seed levels shown in FIG. 1 for the three left-hand tab elements 14.

As shown in FIG. 2c, after the seed 28 is located over the opening 30 by appropriate means as described herein the pod 22 is filled with a suitable filler material 34 and the filler material 34 is forced or tamped down by means such as the tamper 36. Thus, the filler materil 34 is pressed into intimate contact with the seed 28 and intimately interfaces side walls 23 of pod 22 and adheres to the walls 23. Thus, the seed 28 is retained within the filler material 34 and the filler material 34 is retained within the pod 22 of the seed marker tab 14.

Referring now to FIGS. 3a and 3b it is noted that the indentation or pod 22 may have openings of varying size and elongation and location can vary from the top to the bottom of the pod 22. For example, in FIG. 3a elongated openings 32 are provided in pod 22 of the seed marker tab 14 to accommodate an elongated seed 33. FIG. 3c is a view taken along the line 3c—3c of FIG. 3a and shows a cross-sectional view across the width of the pod 22 which indicates side walls 23 as generally straight as compared to another embodiment of the seed marker tab as discussed later.

A further embodiment of an improved seed marker tab is shown in FIGS. 4a, and 4b. FIG. 4a shows a seed marker tab or tab element 44. The seed marker tab or tab element 44 is formed of suitable biodegradable, self-supporting material which will not be crumpled when inserted in the soil. Each tab element 44 has a lower end portion 46 adapted to be inserted in the soil to a predetermined level indicated by a planting line 47, and an upper portion 48 which projects above the planting line 47. An oblong, axially extending indentation or pod 50 is formed in the lower portion 46 of the tab 44 with a tape 51 covering the pod as shown in FIG. 4a. Seeds 52 may be suitably placed over openings 54 as shown in FIG. 4b and held in place by a vacuum. Thereinafter filler material 56 is inserted into the pod 50 and the tape 51 is extended across the pods 50 to hold the filler material 56 in place in the pods 50 in the seed marker tabs 44. Preferably the tape 51 is dimensioned and located to expose equal upper and lower portions of the pod 50 to permit egress of root and cotyledon of germinated seed 52 from pod 50 containing seed 52 and filler material 56 (germinating medium).

Referring now to FIGS. 5a and 5b wherein another embodiment of an improved seed marker tab is shown, it can be seen that a marker tab 60 having an indentation or pod 62 may have the walls 64 of the pod 62 outwardly extending so that an upper opening 62a of the pod 62 is smaller than a lower surface 62b of the pod 62 to provide a more suitable receptacle for receiving seeds 66 and retaining filler material 68. Thus simple physical dimensioning will provide a more effective pod shape for retaining seed and filler material.

Another embodiment of the present invention is shown in FIGS. 6a and 6b wherein a seed marker tab 70 may have openings 72 therein. Seeds 74 may be positioned in the openings 72 and held in pace by a vacuum or other means and a plastic film 76, such as used in skin packaging, may be applied to the marker tab 70 to hold the seeds in place. The plastic film should be water soluble to permit the seeds to free themselves once planted in water.

A further embodiment of the present invention is shown in FIGS. 7a and 7b wherein a tab 80 of degradable and hygroscopic material contains a relatively large opening 81. A thin material strip 85 adheres to the back of the tab 80 beneath the opening 81 to form a pod 82 in the tab 80, the strip 85 having seed openings 86 therein to permit a vacuum to draw seeds 83 to the seed openings 86 and hold them in place for the insertion of a filler material 84. Such a construction as represented by the tab 80 may be used in volume production of seed marker tabs, whether such production be continuous or in discrete sections.

Viewing FIG. 8 seed marker tabs 90 having an upper section 92 and a lower section 94 and a pod 96 may be provided with a non-absorbent coating 97 which acts as a moisture barrier which extends to the soil line 98 to prevent the evaporation of moisture wicked up the lower portion 94 of the tab 90 by the hygroscopic nature of the material from which the seed marker tab 90 is formed when the tab 90 is inserted below the soil surface.

As shown in FIGS. 1-9 above the improved seed marker tab has an elongated pod which has openings at specific locations in the pod, such openings of appropriate size and shape to hold a particular size and shape of seed when a vacuum is created on the back of the pod. The number, depth and location of seed is determined in this fashion. While the seeds are being held in the proper location by a vacuum, such vacuum to emanate from a nozzle, such as the nozzle 100 in FIG. 2c, a physical substance is inserted into the pod so that when the vacuum is released the seeds will stay in place for proper planting depth. The openings in the pods can be modified so that for elongated seeds the pod openings can be elongated slots so that such elongated seeds are held in place in their proper positions by a vacuum. With elongated slots the vacuum is not sufficient to hold a misaligned seed in place but will operate to hold the seed in place when it lies along the slot in an elongated fashion. Such principle is demonstrated in FIG. 3 of the subject application.

In the preparation of the tabs, the series of tabs or cards are placed on a relatively horizontal surface, vacuum is put on the openings at the under side of each pod, or seed receiving area, a random amount of seed is dropped on the seed marker tab, specific numbers of seeds are held to specific openings in the seed marker tabs by the vacuum applied to the underside of the tab and after a short time delay the excess seed may be blown off or sucked off, leaving only those seeds held in place by the vacuum. There is no critical balance between vacuum levels and blow-off or suck-off pressures because the vacuum applied to the rear side of the tab holds the seed intimately while the other air affects essentially loose seed which is not as intimately controlled by the seed holding vacuum. An alternative method of disposing of loose seed is to simply tip the card of seed marker tabs while the vacuum is on to drop the loose seed off.

Once the excess seed is cleared off, the pod is filld with a suitable filler material which is then tamped in place to squeeze down the filler material to fill the pod and intimately contact the seed. Then the tamper is removed, the vacuum on the pod holes is removed and the seed marker tab is a complete assembly.

As shown above various methods have been provided to retain the seed and filler material in the pod. For example, in one instance the filler material may be of such consistency and have such adhering properties as to hold seed and filler material in the pod without any special structure of the pod or additional structure added to the seed marker tab. However, as shown in FIG. 4 a suitable tape can be placed across the pod once the filler material is in place to hold the filler material and seed in the pod for planting. Alternatively as shown in FIG. 5 the pod can be undercut and sloped on its under side to prevent the filler material from flowing out of the pod. When the pod is undercut as shown in FIG. 5 there is no requirement for the addition of tape.

However, the filler material of the preferred embodiment is a substance which fills the pod and adheres to the side of the pod because of the adhesive properties of the filler material, and because the interface of the surfaces interlace; that is, fibrous protrusions between pod edges and substance edges or the intimate relations of the two contacting surfaces prevents the filler material from flowing out of the pod either in a wet condition or after it has dried.

Thus, for example in the preferred embodiment shown in FIG. 7, the adhesive material secured to the back of the tab to form the pod, may be removed after the assembly is complete. Such removal of the tape could be helpful in the germination of smaller seeds.

In lieu of a pod seed openings may be specifically located on a seed marker tab, seeds poured on an upper side of the tab, a vacuum applied to the underside of the tab to hold the seed in the openings in place, and the excess seed then removed. A plastic tape may then be placed over the seed in place on the tab to hold it there. FIG. 6 discloses this embodiment of the present invention.

The present invention thus comprises an improved seed marker tab including several generic embodiments thereof and an associated method of manufacture for the improved marker tab.

It is therefore intended that all such embodiments and substitutions be covered as they are embraced within the scope of the appended claims.

I claim:
1. An improved process for producing seed marker tabs comprising:
   a first step of providing a tab element of vertically elongated proportions having a first lower end portion and a second upper end portion, a planting line dividing the tab element into said first lower end portion and said second upper end portion, said first lower end portion being inserted into a planting medium to a predetermined depth with the second upper end portion projecting above the planting medium, and said tab element being formed of biodegradeable material sufficiently rigid so as to be self-supporting when inserted into the planting medium,
   a second step of providing an opening through the lower end portion of the tab element,
   a third step of providing a backing material on the lower end portion of the tab element to close one end of the opening therethrough and thereby provide an area for receiving seeds,
   a fourth step of providing the backing material closing the one end of the opening in the lower end portion of the tab element with a pattern of seed-receiving openings extending therethrough, the seed-receiving openings of specific number and depth to accommodate the type of seed received in each of said openings, and the seed-receiving openings specifically located with respect to the planting line to optimize the planting depth for each specific variety of seed mounted on the seed marker tab,
   a fifth step of placing the tab on a relatively horizontal surface,
   a sixth step of exposing the seed-receiving area of the tab to a dispersion of a random number of seeds of a specific variety for each tab element on an upper surface of the seed-receiving area provided on the lower end portion of the tab element,
   a seventh step of applying a vacuum to the lower surface of the seed-receiving area of the seed marker tab to retain individual seeds in each of the seed-receiving openings provided in the seed-receiving area of the tab element,
   an eighth step of removing the excess seeds from the the tab element,
   a nineth step of covering the seed remaining in the seed-receiving area of the tab element with means for retaining the seed on the tab when the vacuum applied to the lower surface of the seed-receiving area of the tab element is removed, and a tenth step of removing the vacuum when the retaining means is in place to hold the seed on the tab.

2. The process as claimed in claim 1 wherein the provision of backing material mounted on the lower end portion of the tab element in the fourth step defines a pod or similar recessed receptacle having side walls in the lower end portion of the element.

3. The process as claimed in claim 1 or 2 wherein the eighth step comprises applying a vacuum to the upper surface of the pod to draw off excess seeds while the lower vacuum retains the seeds which fell into the seed-receiving openings.

4. The process as claimed in claim 1 or 2 wherein the eighth step comprises applying a concentrated air current to blow off excess seeds while the lower vacuum retains the seeds which fell into the seed-receiving openings.

5. The process as claimed in claim 1 or 2 wherein the eighth step comprises tipping the tab element to permit excess seeds to drop off while the lower vacuum retains the seeds which fell into the seed-receiving openings.

6. The process as claimed in claim 1 wherein the ninth step comprises wrapping a water-soluble plastic film around the seeds retained in the seed-receiving openings on the tab element after the excess seeds are removed.

7. The process as claimed in claim 2 wherein the ninth step includes inserting a filler material in the receptacle to cover and retain the seeds retained in the seed-receiving openings on the tab element after the excess seeds are removed.

8. The process as claimed in claim 7 wherein the ninth step includes tamping the filler material inserted in the pod to better enable the filler material to adhere to the side walls of the pod.

9. The process as claimed in claim 7 wherein the ninth step includes covering a portion of the pod, when the filler material is in place, with a tape, such tape exposing respective upper and lower portions of the pod to permit normal germination of the seeds therein.

* * * * *